(12) United States Patent
Koh

(10) Patent No.: US 6,958,964 B1
(45) Date of Patent: Oct. 25, 2005

(54) APPARATUS FOR REPRODUCING DATA FROM AN OPTICAL DISC INDUCING VIBRATION AND METHOD THEREOF

(75) Inventor: Young-ok Koh, Yongin (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 647 days.

(21) Appl. No.: 09/612,970

(22) Filed: Jul. 10, 2000

(30) Foreign Application Priority Data

Jul. 8, 1999 (KR) ............................... 1999-27456

(51) Int. Cl.[7] ........................................... G11B 7/095
(52) U.S. Cl. ........................ 369/53.14; 369/47.44; 369/47.39
(58) Field of Search .................. 369/53.13, 53.18, 369/47.44, 47.39, 53.37, 53.28, 53.2

(56) References Cited

U.S. PATENT DOCUMENTS

| 5,440,535 A | * | 8/1995 | Takagi et al. ............ 369/44.28 |
| 5,844,866 A | * | 12/1998 | Fujimoto et al. ......... 369/53.14 |
| 5,862,113 A | * | 1/1999 | Tsuyuguchi et al. ..... 369/53.18 |
| 6,097,680 A | * | 8/2000 | Yen et al. ................. 369/53.18 |
| 6,111,826 A | * | 8/2000 | Minase .................... 369/53.18 |
| 6,181,652 B1 | * | 1/2001 | Katou et al. ............. 369/44.32 |
| 6,185,171 B1 | * | 2/2001 | Bassett et al. ........... 369/53.18 |
| 6,351,440 B1 | * | 2/2002 | Fukuda et al. ........... 369/47.36 |
| 6,377,527 B1 | * | 4/2002 | Hirashima ................ 369/53.23 |

FOREIGN PATENT DOCUMENTS

| EP | 0 821 356 A2 | 1/1998 |
| EP | 0 833 328 A2 | 4/1998 |
| JP | 49-89508 | 8/1974 |
| JP | 58-91536 | 5/1983 |
| JP | 11-126419 | 5/1999 |
| WO | WO 98/27549 | 12/1997 |

OTHER PUBLICATIONS

Nikei MAC, No. 6, *Newly Introduced CD-ROM Drive,* published Sep., 1993, pp. 140-148.

* cited by examiner

Primary Examiner—Brian E. MIller
Assistant Examiner—Michael V. Battaglia
(74) Attorney, Agent, or Firm—Staas & Halsey LLP

(57) ABSTRACT

A method and apparatus for reproducing data from an optical disc in which a disc inducing vibration is detected and the speed of the disc is adjusted to an appropriate speed which does not cause vibration. The method includes obtaining the frequency of vibration by subtracting the count value of track traverse pulses at the lowest speed factor from the count value of track traverse pulses at the highest speed factor; and varying the speed factor of reproducing data from the disc based upon a comparison of the obtained frequency of vibration with a predetermined base value.

11 Claims, 3 Drawing Sheets

110

APPARATUS FOR REPRODUCING DATA FROM AN OPTICAL DISC INDUCING VIBRATION AND METHOD THEREOF

CROSS-REFERENCE TO RELATED APPLICATIONS

This application claims the benefit of Korean Application No. 99-27456, filed Jul. 8, 1999, in the Korean Patent Office, the disclosure of which is incorporated herein by reference.

BACKGROUND OF THE INVENTION

1. Field of the Invention

The present invention relates to an apparatus for reproducing data from an optical disc, and more particularly, to an apparatus for reproducing data from an optical disc in which a disc inducing vibration is detected and its speed is converted into an appropriate reproducing speed.

2. Description of the Related Art

Generally, an apparatus for reproducing data from an optical disc which is revolved by a motor can cause serious vibration according to the state of a medium, or cannot read recorded data due to the instability of a servo state.

The existing apparatuses for reproducing data from an optical disc typically operate by using a vibration sensor or actuator back electromotive force to detect the disc inducing vibration.

For example, an apparatus for reproducing data from an optical disc having a vibration sensor increases the speed of a spindle motor so that the revolution speed of the disc is lowered as a function of the amount of a detected signal.

Furthermore, an optical disc reproducing apparatus may operate by using back electromotive force to increase the speed of a spindle motor so that the revolution speed of the disc is lowered by back electromotive force induced in an actuator. Such a disc operates by: 1) increasing the number of revolutions of the spindle motor to a target number of revolutions per minute (RPM); 2) switching focus and tracking to "OFF" states; 3) amplifying back electromotive force induced in a tracking coil and then converting from analog to digital; 4) switching focus and tracking to "ON" states.

However, the optical disc reproducing apparatus using the above vibration sensor is disadvantageous because sensing ability varies with the point of attachment of a vibration sensor, and also with respect to the assembled state of the apparatus. Furthermore, the optical disc reproducing apparatus using actuator back electromotive force requires a comparator for checking actuator back electromotive force. This is disadvantageous because considerable time is spent checking a vibration-inducing disc after focus and tracking are in the "OFF" state. A further disadvantage of this method is that a certain speed factor is constant when a vibration-inducing disc is checked.

SUMMARY OF THE INVENTION

Accordingly, it is an object of the present invention to provide an apparatus and method for detecting a disc inducing vibration and changing the revolution speed as a function of frequency of vibration of the detected disc.

It is a further object of the invention to provide an apparatus and method for reducing the time spent checking a disc after focus and tracking are off.

Additional objects and advantages of the invention will be set forth in part in the description which follows, and, in part, will be obvious from the description, or may be learned by practice of the invention.

To accomplish the above objects of the present invention, a first embodiment of the present invention is directed to a method of reproducing data from a disc in a disc-reproducing system, the method having the steps of: (a) positioning a pick-up at a predetermined location on the disc and counting the number of track traverse pulses generated when tracking is switched to "OFF" at the lowest speed factor; (b) positioning a pick-up at a predetermined location on the disc and counting the number of track traverse pulses generated when tracking is switched to "OFF" at the highest speed factor; (c) obtaining the frequency of vibration by subtracting the count value of track traverse pulses at the lowest speed factor (counted in step 'a') from the count value of track traverse pulses at the highest speed factor (counted in step 'b'); and (d) comparing the frequency of vibration obtained in step 'c' with a predetermined base value, and varying the speed factor of reproducing data from the disc based upon this comparison.

A second embodiment of the present invention is directed to a method for reproducing data from a disc in a disc-reproducing system, the method comprising the steps of: (a) positioning a pick-up at a predetermined location on the disc and counting the number of track traverse pulses generated when a tracking loop is switched to "OFF" at an arbitrary speed factor; and (b) comparing the number of the track traverse pulses counted in step 'a' with a pre-determined base value, and varying the speed factor of reproducing data from the disc based upon this comparison.

A third embodiment of the present invention, is directed to an apparatus for reproducing data from a disc inducing vibration, the apparatus having a pick-up unit for detecting a tracking traverse signal by revolving the disc in a tracking "OFF" state; a signal amplifying unit for differentially-amplifying the tracking traverse signal detected by the pick-up unit; a signal comparator for generating a tracking traverse pulse signal after comparing the tracking traverse signal amplified in the signal amplifying unit with a base signal; and a control unit for counting the number of track traverse pulses generated in the signal comparator at the lowest speed factor of the disc and also at the highest speed factor of the disc, obtaining the difference between the two counted numbers, and then determining the frequency of vibration of the disc based upon the difference, and varying the speed factor of the disc as a function of the frequency of vibration.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like-referenced numerals refer to like-elements throughout.

We begin by reviewing the various eccentricities of a disc. A mass eccentric disc causes vibration during reproduction because it has a different center of gravity. An axial eccentric disc causes vibration during reproduction because it has a warped shape and also displays the characteristics of mass eccentricity because of its twisted axis. A net eccentric disc does not cause vibration and only has an eccentric component because the data on the disc is twisted.

In a mass eccentric disc, weight imbalance causes a centrifugal force, and when the disc operates, the shaft gap of the driving motor causes vibration of the motor axis. Furthermore, chucking of the turntable causes vibration of the axis.

The vibration of a disc axis increases as a function of the speed and the eccentric degree of a motor. Assuming that the pick-up is fixed, the vibration of the motor axis causes vibration in reproducing because it has a warped shape and the characteristics of mass eccentricity because of its twisted axis. A net eccentric disc does not cause vibration and only has an eccentric component because recording of the disc is twisted.

In a mass eccentric disc, unbalance in the weight causes a centrifugal force, and the shaft gap of the driving motor, when the disc operates, causes vibration of the motor axis. In addition, chucking of the turntable causes vibration of the axis.

The vibration of a disc axis increases with respect to the speed and eccentric degree of a motor. When it is assumed that the pick-up is fixed, the axis vibration causes a disc to move from side to side with each revolution as viewed from the object lens of the pick-up.

Figure 1:
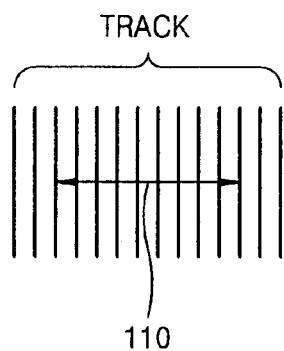
FIG. 1 is a conceptual diagram showing the generation of a track traverse signal by vibration.

As a result, as shown in FIG. 1, with the pick-up unit 220 (not shown) fixed, a disc 210 is moved by axis variation (axis vibration), and disc migration causes a track traverse signal in the form of an analog frequency. That is, 110 in FIG. 1 can be the migration length caused by the vibration.

Using this track traverse signal, the present invention determines the frequency of vibration.

A net eccentric disc causes a lot of track traverse signals both at a lower speed factor and at a higher speed factor. This differs from an axial eccentric disc and a mass eccentric disc which do not cause vibration at a lower speed factor and therefore, cause few track traverse signals. However, at a higher speed factor, they cause vibration and therefore cause strong track traverse signals.

Accordingly, by comparing a track traverse signal at a lower speed factor with that at a higher speed factor, it is determined whether or not an axial eccentric disc or a mass eccentric disc causes the vibration.

Figure 2:
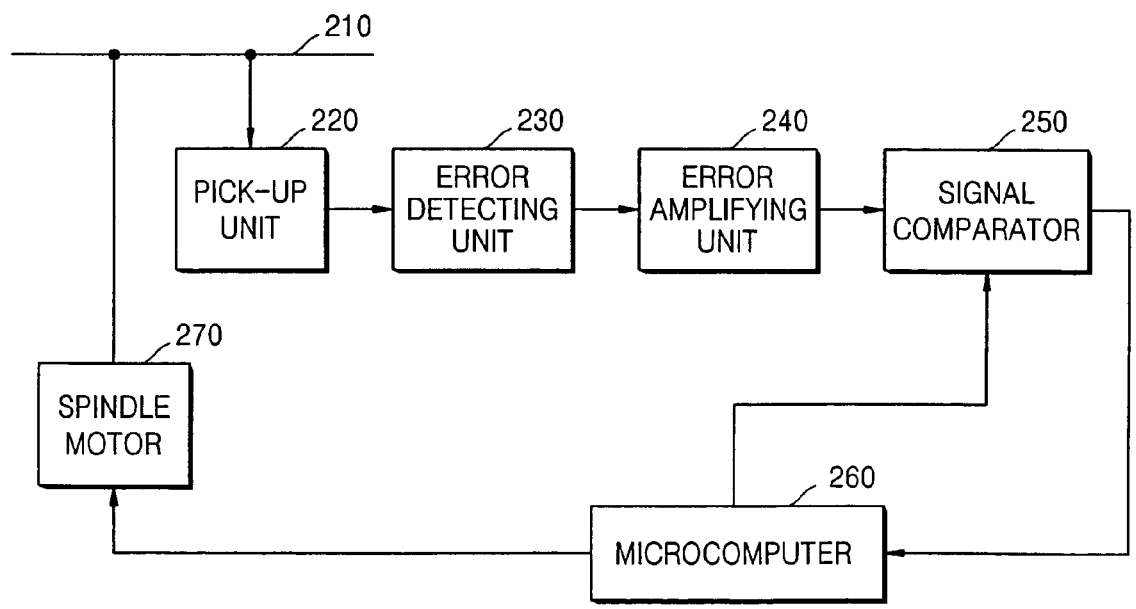
FIG. 2 is a block diagram showing an apparatus for reproducing a disc inducing vibration according to the present invention.

FIG. 2 is a block diagram showing an apparatus 200 for reproducing disc inducing vibration according to the present invention. The apparatus has a pick-up unit 220, an error detecting unit 230, an error amplifying unit 240, a signal comparator 250, a microcomputer 260, and a spindle motor 270.

First, the pick-up unit 220 is provided with photodiodes (E,F) (not shown). The photodiodes (E,F) detect a tracking traverse signal from the revolving disc 210 when focus is "ON" and the tracking loop is "OFF". At this time, the pick-up unit 220 is set to a predetermined voltage at its innermost circumference. Tracking is "OFF" for a full range of speed factors in order to minimize an error from shaking and a measuring error.

The error detecting unit 230 calculates the tracking traverse signal, which was detected by the pick-up unit 220, in an E-F form. Next, the error amplifying unit 240 differentially-amplifies the E-F form tracking traverse signal calculated in the error detecting unit 230, and sends the amplified signal to the signal comparator 250. The comparator 250 compares the amplified signal to a base signal, and then generates a pulse signal. The microcomputer 260 then determines the frequency of vibration by counting pulse signals generated in the signal comparator 250 at the lowest speed factor of the disc and at the highest speed factor of the disc. Then the revolution of the spindle motor is increased or decreased as a function of the frequency of vibration.

Specifically, in order to determine whether or not a disc is axial eccentric or mass eccentric, the microcomputer 260 subtracts the counted value of the track traverse signal at a lower speed factor from the counted value of the track traverse signal at a higher speed factor. The frequency of vibration is determined by dividing the difference between the counted values by the number of revolutions of the spindle. Then, the revolution speed is varied by comparing the frequency of vibration with a base value. For example, when the frequency of vibration is greater than or equal to 80 Hz, the speed factor is set to 16 times the lower speed factor. This lower speed factor is used because the vibration is great. When the frequency of vibration is greater than or equal to 40 Hz (but less than 80 Hz), the speed is set to 20 times the lower speed factor. When the frequency of vibration is less than 40 Hz, the speed is set to 24 times the lower speed factor. This higher speed factor is used because the vibration is small. After setting the speed factor, the microcomputer 260 switches tracking "ON" and resumes normal reproduction of data from the disc.

Figure 3:
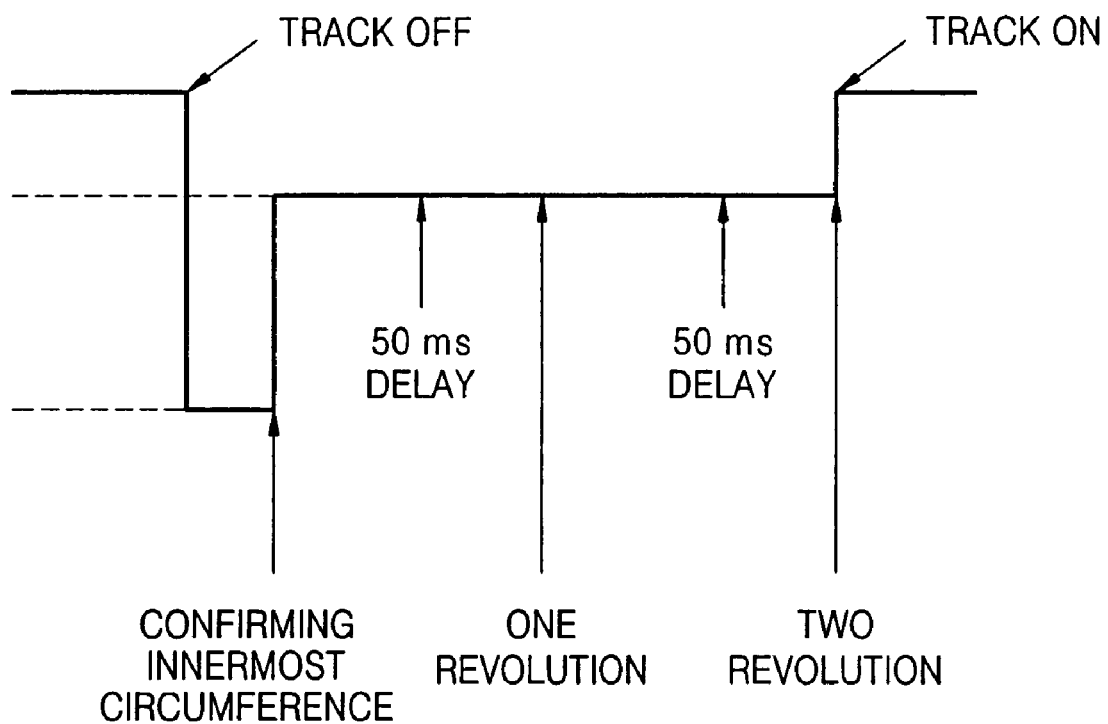
FIG. 3 is a voltage waveform which measures an actual track traverse signal over a full range of speed factors.

FIG. 3 is a voltage waveform which measures an actual track traverse signal over a full range of speed factors in order to reduce disc shaking and measuring errors.

Referring to FIG. 3, the microcomputer 260 (not shown) switches tracking "OFF" by applying a track-off voltage to the driving motor of the pick-up unit 220 (not shown). In this state, the microcomputer 260 checks the innermost circumference of the disc 210 (not shown). The microcomputer 260 counts the number of pulses of a track traverse signal after a predetermined time, for example, 2 revolutions of the disc (about 100 ms delay). After the microcomputer 260 counts the pulses, it switches tracking "ON" by applying a track-on voltage to the driving motor.

Figure 4:
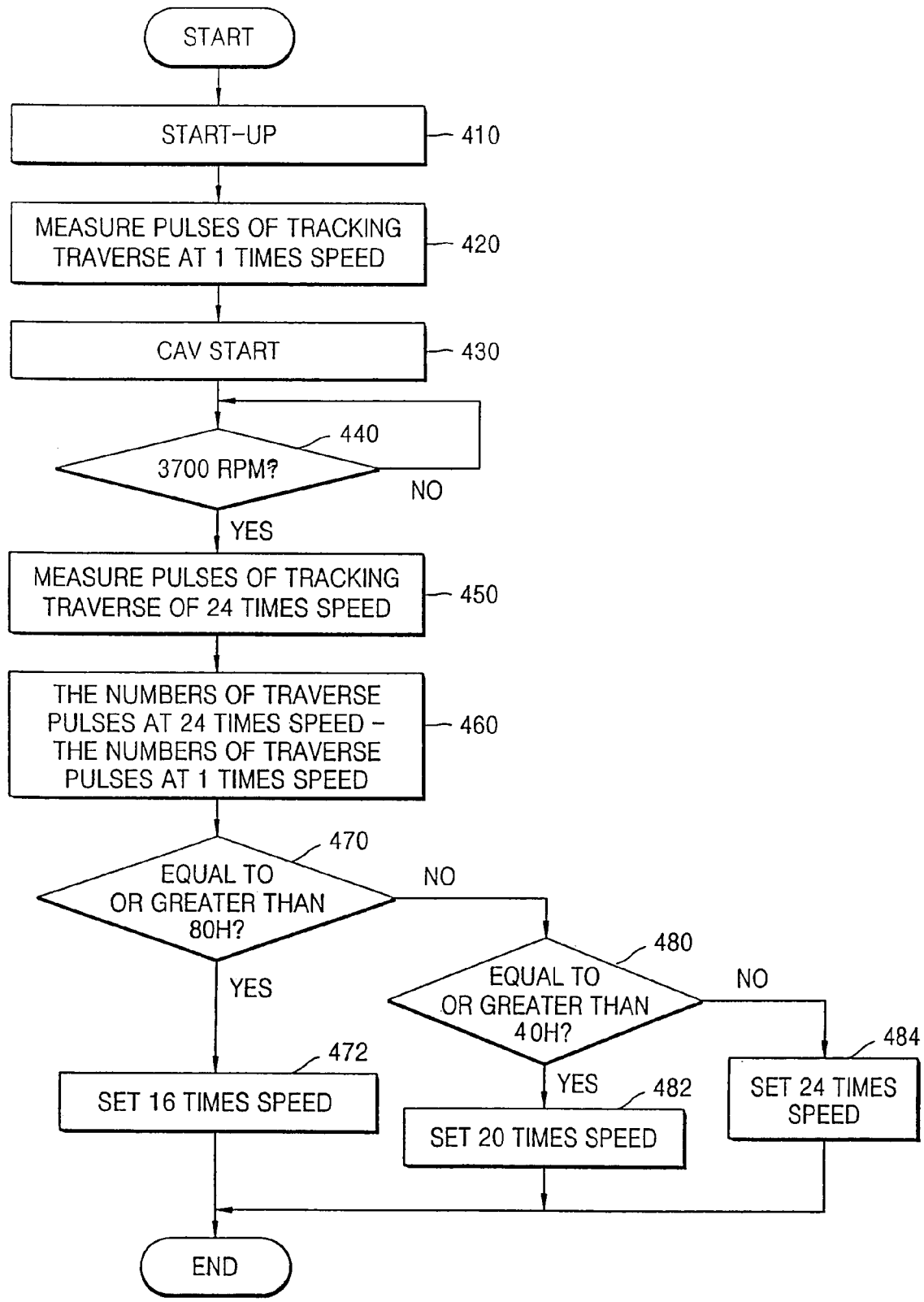
FIG. 4 is a flowchart illustrating an example of a method of reproducing a disc inducing vibration according to the present invention.

FIG. 4 is a flowchart illustrating an example of a method of reproducing data from a disc inducing vibration according to the present invention.

First, the disc is started up by switching focus "ON" and switching tracking "OFF" (step 410).

In step 420, after switching tracking to "OFF" at one times the lower speed factor, in order to limit the movement range of the pickup, a microcomputer 260 detects whether the pickup has reached the innermost circumference of the disc using a limit switch (not shown). After a predetermined time passes, the number of track traverse pulses is counted.

In step 430, the constant angular velocity (CAV), which increases from inner circumferences to outer circumferences, is started.

In step 440, the disc is revolved until the speed reaches 3700 RPM.

In step 450, the speed is 3700 RPM, and tracking is switched to "OFF" at the highest speed factor, for example, at 24 times speed. Then, at a predetermined time after checking the innermost circumference of the disc, the number of pulses of the track traverse signal is measured.

In step 460, the frequency of vibration is measured by subtracting the number of traverse pulses at the lowest speed factor (1 times speed) from the number of traverse pulses at the highest speed factor (24 times speed).

In steps 470 and 480, the measured frequency of vibration is compared with predetermined basis frequencies (for example, 80 Hz and 40 Hz).

In steps 472, 482 and 484, the speed factor is set according to the measured vibration frequency. When the measured frequency of vibration is 80 Hz or more (large vibration), the speed factor is set to a lower speed factor (16 times speed) in order to reduce vibration. When the measured frequency of vibration is less than 80 Hz and greater than or equal to 40 Hz, the speed factor is set to 20 times speed. When the measured frequency of vibration is less than 40 Hz, the disc is determined to have a small vibration and a higher speed factor (24 times speed) is set. At this time, the base of the speed factor can be set to 45 dB noise or less.

As described above, according to the present invention, an appropriate speed factor can be set with respect to the frequency of vibration of a disc. Furthermore, because the frequency of vibration is checked with focus "ON", the invention realizes the advantage of faster tracking.

Although a few preferred embodiments of the present invention have been shown and described, it would be appreciated by those skilled in the art that changes may be made in these embodiments without departing from the principles and spirit of the invention, the scope of which is described in the claims and their equivalents.

What is claimed is:

1. A method of reproducing data from a disc in a disc-reproducing system, comprising:
    positioning a pick-up at a specified position on the disc and counting a number of track traverse pulses which are generated when a tracking loop is switched to "OFF" at a first rotation speed and a second rotation speed;
    determining whether the disc is one of axially eccentric or mass eccentric using the counts at the first and second rotation speeds;
    varying a third rotation speed during reproduction of data from the disc based on the disc eccentricity; and
    maintaining the pickup in a fixed position while counting the number of track traverse pulses,
    wherein the third rotation speed is decreased with increased frequency of vibration, the third rotation speed being approximately 16 times the first rotation speed when the frequency of vibration is determined to be greater than or equal to 80 Hz, the third rotation speed being 20 times the first rotation speed when the frequency of vibration is determined to be greater than or equal to 40 Hz and less than 80 Hz, and the third rotation speed being 24 times the first rotation speed when the frequency of vibration is determined to be less than 40 Hz.

2. A method of reproducing data from a revolving disc in a disc-reproducing system, comprising:
    counting a number of track traverse pulses at a first revolving speed;
    counting a number of track traverse pulses at a second revolving speed, the second revolving speed being approximately 24 times the first revolving speed;
    determining a frequency of vibration of the disc by comparing the number of track traverse pulses counted at the first revolving speed with the number of track traverse pulses counted at the second revolving speed,
    comparing the determined frequency of vibration of the disc with a predetermined base value; and
    revolving the disc at a reproducing speed based upon the comparison of the determined frequency of vibration with the predetermined base value;
    wherein the reproducing speed is decreased with increased frequency of vibration, the reproducing speed being approximately 16 times the first revolving speed when the frequency of vibration is determined to be greater than or equal to 80 Hz, the reproducing speed being 20 times the first revolving speed when the frequency of vibration is determined to be greater than or equal to 40 Hz and less than 80 Hz, and the reproducing speed being 24 times the first revolving speed when the frequency of vibration is determined to be less than 40 Hz.

3. The method of reproducing data from a disc in a disc-reproducing system of claim 2, wherein the disc further comprises an inner circumference and the disc-reproducing system includes tracking having "OFF" and "ON" states, further comprising:
    switching tracking in the disc-reproducing system to the "OFF" state; and
    checking the innermost circumference of the disc.

4. The method of reproducing data from a disc in a disc-reproducing system of claim 3, wherein the counting of track traverse pulses at the first revolving speed and the second revolving speed comprises counting the track traverse pulses at a predetermined time after checking the innermost circumference of the disc.

5. The method of reproducing data from a disc in a disc-reproducing system of claim 4, wherein the predetermined time after checking the innermost circumference of the disc is approximately equal to a time for the disc to complete two revolutions.

6. The method of reproducing data from a disc in a disc-reproducing system of claim 4, wherein the predetermined time after checking the innermost circumference of the disc is approximately 100 ms.

7. An apparatus for reproducing data from a disc inducing vibration, comprising:
    a pick-up unit maintaining a fixed position while detecting a tracking traverse signal;
    a signal comparator comparing the tracking traverse signal with a base signal and then generating a tracking traverse pulse signal comprised of at least one tracking traverse pulse; and
    a control unit which counts the number of track traverse pulses generated at a first revolving speed of the disc and at a second revolving speed of the disc, determines whether the disc is one of axially eccentric and mass eccentric using the track traverse pulse counts at the first and second revolving speeds, and changes a speed of the disc for data reproduction according to the type of disc eccentricity,
    wherein the speed for data reproduction is decreased with increased frequency of vibration, the speed for data reproduction being approximately 16 times the first revolving speed when the frequency of vibration is determined to be greater than or equal to 80 Hz, the speed for data reproduction being 20 times the first revolving speed when the frequency of vibration is determined to be greater than or equal to 40 Hz and less than 80 Hz, and the speed for data reproduction being 24 times the first revolving speed when the frequency of vibration is determined to be less than 40 Hz.

8. The apparatus for reproducing data from a disc inducing vibration of claim 7, wherein the pick-up unit further comprises a tracking "OFF" state and a tracking "ON" state, and the pick-up unit detects a tracking traverse signal by revolving the disc in the tracking "OFF" state.

9. The apparatus for reproducing data from a disc inducing vibration of claim 8, further comprising a signal amplifying unit to differentially amplify the tracking traverse signal detected in the pick-up unit prior to sending the signal to the signal comparator.

10. The apparatus for reproducing data from a disc inducing vibration of claim 9, wherein the control unit counts the number of track traverse pulses at a predetermined time.

11. An apparatus for reproducing data from a disc inducing vibration, comprising:

a pick-up unit maintaining a fixed position while detecting a tracking traverse signal;

a signal comparator comparing the tracking traverse signal with a base signal and then generating a tracking traverse pulse signal comprised of at least one tracking traverse pulse; and a control unit that counts the number of track traverse pulses generated in the signal comparator at a first revolving speed of the disc and also at a second revolving speed of the disc, determines a frequency of vibration of the disc based upon the track traverse pulse counts, and changes a speed of the disc based upon the frequency of vibration of the disc, wherein the pick-up unit further comprises a tracking "OFF" state and a tracking "ON" state, and the pick-up unit detects a tracking traverse signal by revolving the disc in the tracking "OFF" state, wherein the control unit counts the number of track traverse pulses at a predetermined time, and wherein the predetermined time for counting the number of track traverse pulses is approximately 100 ms after checking an innermost circumference of the disc.

\* \* \* \* \*

UNITED STATES PATENT AND TRADEMARK OFFICE
CERTIFICATE OF CORRECTION

PATENT NO. : 6,958,964 B1 Page 1 of 1
APPLICATION NO. : 09/612970
DATED : October 25, 2005
INVENTOR(S) : Young-ok Koh It is certified that error appears in the above-identified patent and that said Letters Patent is hereby corrected as shown below:

On the cover page, column 2, (Primary Examiner) line 1, change "Miller" to --Miller--

Column 5, line 48, change "pickup" to --pick-up--

Signed and Sealed this

Eleventh Day of July, 2006

JON W. DUDAS
*Director of the United States Patent and Trademark Office*